(12) United States Patent
Kishi

(10) Patent No.: US 7,585,414 B2
(45) Date of Patent: Sep. 8, 2009

(54) WATER TREATMENT BY ACTIVATED SLUDGE

(76) Inventor: Hiroshi Kishi, 1-9-10-702 Yushima, Bunkyo-ku, Tokyo 113-0034 (JP)

( * ) Notice: Subject to any disclaimer, the term of this patent is extended or adjusted under 35 U.S.C. 154(b) by 494 days.

(21) Appl. No.: 10/586,889

(22) PCT Filed: Jan. 20, 2005

(86) PCT No.: PCT/IB2005/000252

§ 371 (c)(1), (2), (4) Date: Jul. 20, 2006

(87) PCT Pub. No.: WO2005/070838

PCT Pub. Date: Aug. 4, 2005

(65) Prior Publication Data

US 2008/0237122 A1    Oct. 2, 2008

(51) Int. Cl.
C02F 3/00    (2006.01)
(52) U.S. Cl. .................................................. 210/620
(58) Field of Classification Search ................. 210/620, 210/220
See application file for complete search history.

(56) References Cited

U.S. PATENT DOCUMENTS 5,071,559 A * 12/1991 Bleeker ..................... 210/605
5,266,200 A * 11/1993 Reid ........................... 210/605
5,906,746 A * 5/1999 Helmo et al. ............... 210/614

FOREIGN PATENT DOCUMENTS

| FR | 2372121 A | * | 7/1978 |
| FR | 2 814 453 A | | 3/2002 |
| WO | WO 96/23735 A | | 8/1996 |

OTHER PUBLICATIONS

Derwent Accession No. 1978-25292A, English language Abstract of FR 2372121, published 1986.*
International Search Report PCT/IB2005/000252 dated Apr. 29, 2005 (European Patent Office).

* cited by examiner

*Primary Examiner*—Chester T Barry
(74) *Attorney, Agent, or Firm*—Ostrolenk Faber LLp

(57) ABSTRACT

The invention relates to a method of treating water with activated sludge containing micro-organisms. The method comprises the steps of: preparing an environmentally adapted biomass mixture by adapting the activated sludge to a quantity of water having given characteristics in a single reactor under first levels of aeration, whereby the environmentally adapted biomass mixture acquires the capacity to cause concurrent reactions for BOD removal, nitrification and de-nitrification; and treating a portion of water having substantially the same given characteristics with the environmentally adapted biomass mixture capable of causing the concurrent reactions, in the single reactor under a second level of aeration not higher than the first levels of aeration.

19 Claims, 8 Drawing Sheets

Org.-N

NH$_3$-N

NO$_2$-N

NO$_3$-N → N$^2$

WATER TREATMENT BY ACTIVATED SLUDGE

CROSS REFERENCE TO RELATED APPLICATION

The present application is a 35 U.S.C. §§ 371 national phase conversion of PCT/IB2005/000252, filed 20 Jan. 2005, which claims priority of European Application No. 04290157.9, filed 21 Jan. 2004. The PCT International Application was published in the English language.

BACKGROUND OF THE INVENTION

The invention generally pertains to the field of water treatments, e.g. waste water treatments. The water treatable by the present invention includes, for instance, sewage, breeding waste water, hog breeding waste water, human waste water, household waste water, agriculture waste water, starch industry waste water, food processing waste water and forestry waste water. The invention concerns a method for treating such water by activated sludge. The method according to the invention comprises environmentally adapting (or acclimatizing) micro-organisms, and nitrifying and de-nitrifying the waste water by these acclimatised micro-organisms. The particularities of the present method consist, inter alia, of causing a series of reactions in the same reactor, preferably under strong aeration at the acclimatization stage of the treatment.

In the past, many scientists have researched into nitrification and de-nitrification reactions taking place in micro-organisms, in order to elucidate the nitrogen cycle. A large part of the results obtained were reviewed by A. J. Kluyver and C. B. von Niel in a book entitled "The Microbe's Contribution to Biology" published in 1956 by Harvard University Press, Cambridge Mass. USA. This review gives experimental details on the environmental conditions for growing micro-organisms and on their capacity to adapt to the environments.

The methods for analysing the sludge piled up in polluted closed water systems were developed by The Environment Agency of Japan and published in 1985 by The Japanese Society for Environmental Analysis in a report entitled "Ways of Evaluating Underwater Sediments and Commentary on the Results".

Further, microbial de-nitrification reactions were applied to waste water treatments by H. Kishi, and the results were published in 1985 in a document entitled "Hybrid Lagoon System" edited by Rural Environment Research Association, Tokyo, Japan. This document discloses a newly modeled water-utilisation system, in which specific measuring and aeration apparatuses are applied for controlling the waste water treatment. Those apparatuses are required for implementing microbial de-nitrification technologies and establishing efficient waste-water treatment technologies.

Further yet, a new waste-water treatment process was conceived and applied to microbial de-nitrification reactions, and the results obtained were published by H. Kishi in 1991 in a report entitled "Experimental Report on Water-Bottom Sediment Purification in Marsh Furukawa", edited by Ministry of Transport. 15$^{th}$ US-JAPAN Expert Meeting. According to this report, noxious underwater sediments could be recovered as biologically activated sludge containing abundant oxygen, and returned to a closed water system. Accordingly, the problem of sludge devoid of oxygen was solved and a new bionomical system was created.

In the above prior arts, the de-nitrification installations are conceived on the basis of a continuous activated sludge method. Such methods generally involve a series of installations, i.e. a BOD-removing installation, a nitrification installation and a de-nitrification installation. In other words, three reactions are carried out in separate reactors.

However, the above-mentioned continuous de-nitrification installations require a complicated construction and many types of reagents and, as a result, consume a considerable amount of energy.

For instance, there exists a three-step de-nitrification system, in which a BOD removal reactor, a nitrification reactor and a de-nitrification reactor are arranged in series. This system, tried in the USA, requires complicated devices, and methanol has to be added. Moreover, it consumes a lot of energy and increases social burdens.

Recently, there have also been conceived waste-water treatment sites based on the principle of half-feed-back-type activated sludge method. The reactor used in this method is called "Semi-Batch Reactor" and referred to as "SBR". According to this principle, the nature of waste water is analysed beforehand, and optimization conditions for waste water treatments are simulated using a model. The model is then used as know how.

The system "SBR" is controlled by introducing a factor of time and carrying out intermittent aerations. Such a controlling method, though automatically operated, requires the de-nitrification reaction to be caused under predetermined conditions. Accordingly, this method is not based on an automatic control system, in which parameters under running conditions are fed-back in real time. As a result, the system cannot maintain the optimum conditions when confronted with external or internal turbulences or variations.

There thus exists no technology according to which data on microbial reactions are fed back without using mathematical or logical analysis and further, microbial de-nitrification reactions are completely self-controlled.

By contrast, according to the invention, activated sludge is adapted so as to acquire both nitrification and de-nitrification functions that co-exist in a single reactor or lagoon. The activated sludge also becomes self-responsive to variations of the external parameters such as quantities, substrates and temperatures of the activated sludge. Further, the technology of the invention enables microbial de-nitrification activities to be maintained at high level.

SUMMARY OF THE INVENTION

One object of the invention is to reduce enormous energy and reagent consumptions resulting from the operation of waste-water treatment installations, thereby lightening a community or municipality of considerable economic burdens.

Another object is to maintain a stable de-nitrification function, free of external turbulences, by means of domesticating various types of micro-organism, each of which has a distinctive autonomous nature, and a different acclimatization capacity, time-lag behaviour and structural and functional hierarchization, as well as a different tendency when interacting with others. Indeed, these factors are difficult to foresee by mathematical and analytical prevision methods.

To this end, there is provided a method of treating water with activated sludge containing micro-organisms. The method comprises the steps of:

preparing an environmentally adapted biomass mixture by adapting the activated sludge to a quantity of water having given characteristics in a single reactor under first levels of aeration, whereby the environmentally adapted biomass mixture acquires the capacity to cause concurrent reactions for BOD removal, nitrification and de-nitrification; and treating a portion of water having substantially the same given characteristics with the environmentally adapted biomass mixture capable of causing the concurrent reactions, in the single reactor under a second level of aeration not higher than the first levels of aeration.

Typically, the quantity of water having given characteristics is waste water.

Preferably, the adapted-biomass preparing step comprises:

carrying out an initial adapting cycle treatment essentially consisting of: (a) a step of feeding the quantity of water into a solution of the activated sludge at a given inflow rate to prepare a suspension mixture; (b) an aeration step carried out under initial levels of aeration; (c) a sedimentation step for separating a supernatant portion and a sediment portion; and (d) a step of withdrawing the supernatant portion at an outflow rate substantially equal to the inflow rate, the steps (a), (b), (c) and (d) being repeated until the activated sludge can cause a BOD-removal reaction and a nitrification reaction; and carrying out a subsequent adapting cycle treatment essentially consisting of the steps (a), (b), (c), and (d) defined above, except that the step (b) in said subsequent adapting cycle treatment is performed under subsequent levels of aeration lower than the initial levels of aeration, the steps (a), (b), (c) and (d) being repeated until the activated sludge can cause concurrent reactions for BOD removal, a nitrification and de-nitrification at a given pH value.

Preferably yet, the water-treating step comprises:

carrying out a concurrent-reaction cycle treatment essentially consisting of: (a') a step of feeding the portion of water into the environmentally adapted biomass mixture at a given inflow rate; (b') an aeration step carried out under the second level of aeration substantially equal to the subsequent levels of aeration, at a given pH value; (c') a sedimentation step for separating a supernatant portion and a sediment portion; and (d') a step of withdrawing the supernatant portion at an outflow rate substantially equal to the inflow rate.

Suitably, the given pH value stands between 6 and 7.

Suitably yet, the given pH value is about pH 6.8.

Typically, the adapted-biomass preparing step or the water-treating step forms a unitary treatment cycle of about 6 to 8 hours.

Typically yet, the aeration step (b) or (b') lasts about 4 to 5 hours and comprises stirring the suspension mixture at an aeration rate of at least one volume equivalent per hour relative to the volume of the suspension mixture.

Typically still, the feeding step (a) or (a'), as well as the withdrawing step (d) or (d'), respectively lasts about 30 minutes.

Preferably, the amount of the supernatant portion withdrawn in the withdrawing step (d) or (d') is in the range of from about 20 to about 30% of the total volume of the suspension mixture.

Preferably yet, the sedimentation step (c) or (c') lasts about one hour.

Suitably, the solution of activated sludge in the adapted-biomass preparing step is prepared by feeding a portion of activated sludge into a clean water contained in the reactor to yield a suspension n-mixture having a predetermined suspension ratio of from about 1,000 to about 3,000 mg/l.

Suitably yet, the solution of activated sludge in the adapted-biomass preparing step is prepared by feeding a portion of activated sludge into a clean water contained in the reactor to yield a suspension mixture having a predetermined suspension ratio of from about 1,500 to about 2,500 mg/l.

The method may further comprise, subsequent to the withdrawing step (d) or (d'), the step of decreasing the aeration rate applied in the aeration step (b) or (b'), when pH is below the given value.

Alternatively, the method may further comprise, subsequent to the withdrawing step (d) or (d'), the step of increasing the aeration rate applied in the aeration step (b) or (b'), when pH is above the given value.

Preferably, the decreasing or increasing step comprises using a frequency converter and modifying the revolution of the aerating device by decreasing or increasing frequencies.

Preferably yet, the frequencies for modifying the revolution of the aerating device are kept at about 20 Hz at the minimum.

Suitably, the sedimentation step (c) or (c') comprises measuring dissolved oxygen concentrations, and extracting part of the sediment portion from the reactor, when the measured concentrations indicates that oxygen saturation ratio is below about 25%.

Suitably yet, the temperature of the suspension mixture is kept between about 10° C. and about 20° C. by extracting part of the sediment portion from the reactor.

The invention also relates to a system for treating water with activated sludge containing micro-organisms. The system comprises:

a single reactor;

means for preparing an environmentally adapted biomass mixture by adapting the activated sludge to a quantity of water having given characteristics in a single reactor under first levels of aeration, whereby the environmentally adapted biomass mixture acquires the capacity to cause concurrent reactions for BOD removal, nitrification and de-nitrification; and means for treating a portion of water having substantially the same given characteristics with the environmentally adapted biomass mixture capable of causing the concurrent reactions, in the single reactor under a second level of aeration not higher than the first levels of aeration.

the system being adapted for performing the method mentioned above.

Preferably, the means for preparing an environmentally adapted biomass mixture comprises an apparatus for carrying out:

an initial adapting cycle treatment essentially consisting of: (a) a step of feeding the quantity of water into a solution of the activated sludge at a given inflow rate to prepare a suspension mixture; (b) an aeration step carried out under initial levels of aeration; (c) a sedimentation step for separating a supernatant portion and a sediment portion; and (d) a step of withdrawing the supernatant portion at an outflow rate substantially equal to the inflow rate, the steps (a), (b), (c) and (d) being repeated until the activated sludge can cause a BOD-removal reaction and a nitrification reaction; and a subsequent adapting cycle treatment essentially consisting of the steps (a), (b), (c), and (d) defined above, except that the step (b) in the subsequent adapting cycle treatment is performed under subsequent levels of aeration lower than the initial levels of aeration, the steps (a), (b), (c) and (d) being repeated until the activated sludge can cause concurrent reactions for BOD removal, a nitrification and de-nitrification at a given pH value.

Preferably yet, the means for treating a portion of water comprises an apparatus for carrying out a concurrent-reaction cycle treatment essentially consisting of: (a') a step of feeding the portion of water into the environmentally adapted biomass mixture at a given inflow rate; (b') an aeration step carried out under; the second level of aeration substantially equal to the subsequent levels of aeration, at a given pH value; (c') a sedimentation step for separating a supernatant portion and a sediment portion; and (d') a step of withdrawing the supernatant portion at an outflow rate substantially equal to the inflow rate.

The invention further concerns an installation for treating water comprising a system described above.

As can be understood from above, the method of the invention has the following technical features:

- a portion of activated sludge extracted from a continuous waste-water treatment installation is acclimatized in a reactor or lagoon, so that a BOD-removal function, a nitrification and a de-nitrification function are respectively created in the micro-organisms;
- The microbial de-nitrification, as well as BOD removal and nitrification, are carried out in a same single reactor or lagoon;
- The BOD-removal, nitrification and de-nitrification functions are rendered to co-exist in the same reactor or lagoon during the waste-water treatment;
- The de-nitrification reaction can be maintained even if the external parameters vary;
- The activities of activated sludge are optimised under inside the optimum aeration range;
- Mathematical or logical analyses are not used;
- The autonomous nature of micro-organisms is fully exploited so as to minimize time delays for microbial activities;
- No reagents are used, so that the equipments for adding additives are suppressed;
- Abnormal situations are detected and automatically corrected, the de-nitrification function being thus restored to its normal level automatically; and
- The treatment method is based on the hierarchically organised structures and functions of different types of micro-organisms.

By virtue of these features, the following results are obtained:

- 90% of the de-nitrification capacity can be maintained, even if the amount of sewage inflow fluctuates from 20 to 100% of designed capacity value;
- The amount of sludge is optimised and its de-nitrification function can be maintained, even if the temperature of suspension mixture drops to 10° C. or below; and
- Energy costs for de-nitrification are cut by 35-50%, compared to the prior technologies.

As is well known, life activities (metabolism and catabolism) in micro-organisms entail multi-dimensional, non-linear reactions, which enable the micro-organisms to respond to changes in the environment. Especially, their de-nitrification function involves the adaptation mechanisms which are arranged in a hierarchical structure. An automatic control of these mechanisms thus appears very difficult.

The present invention intends to control the growth environments of these micro-organisms by inducing their "concealed" ancillary capacities, in addition to their BOD removal, nitrification and de-nitrification functions.

To attain such objects, the invention applies the principle of process "SBR", and renders to practical use a new process that optimises the de-nitrification function of micro-organisms.

The invention utilizes a mixed micro-organism population which includes a multiple and hierarchized structure, and acclimatises the mixed micro-organism population.

Further, the new process is designed to optimise the microbial de-nitrification function by using empirical (not mathematical) knowledge. This process is characterized by requiring no water-quality analysis, no aeration-rate calculation, no qualitative or quantitative analysis of activated sludge, or no forecasting based on mathematical or statistics analysis. Its technical features include installing a self-learning control system for optimising the amount of aeration and activated sludge, using such parameters as dissolved oxygen (DO), pH, oxygen reduction potential (ORP) and observations/analysis of wave shapes, which are commonly used in the SBR process.

BRIEF DESCRIPTION OF THE DRAWINGS

The above, and the other objects, features and advantages will be made apparent from the following description of the preferred embodiments, given as examples, with reference to the accompanying drawings, in which.

DESCRIPTION OF A PREFERRED EMBODIMENT

Although the preferred embodiments are described herebelow with reference to waste water, the same techniques can also be applied to other types of water.

Figure 1:
FIG. 1 shows dissimilatory steps of nitrogen compounds during the BOD removal, nitrification and de-nitrification reactions.
Figure 1:
Figure 1:
Figure 1:

FIG. 1 schematically shows how the nitrogen molecules contained in organic compounds are reacted and removed from waste water during a typical waste water treatment process. A major part of nitrogen molecules in waste water is contained as organic nitrogen (Org.-N in the figure) and ammonia-type nitrogen ($NH_3$—N). The Org.-N is transformed into $NH_3$—N by aeration, and further into nitrate-type nitrogen ($NO_3$—N) via nitrite-type nitrogen ($NO_2$—N). Nitrate respiration occurs when dissolved oxygen begins to lack, and thus transforms $NO_3$—N into nitrogen gas molecules ($N_2$) by reduction.

Figure 2:
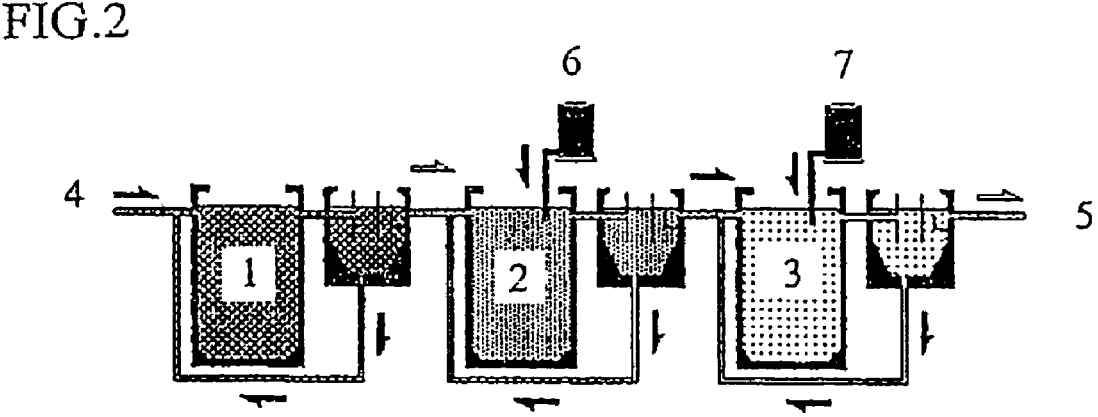
FIG. 2 is a side view of a conventional three-step de-nitrification system.

FIG. 2 shows a conventional three-step de-nitrification system, which comprises a BOD removal unit (stage 1), a nitrification unit (stage 2) and a de-nitrification unit (stage 3) arranged in series. For instance, town sewage 4 is supplied into the system and treated water 5 is withdrawn therefrom. This system requires a pH-adjusting device 6, a methanol-adding device 7 and the like.

Alternatively used, a common aerated lagoon has a comparatively large surface and a depth of less than 2.4 m. For the treatment of town or urban sewage, such an aerated lagoon usually requires a surface large enough to retain a cumulative discharge volume for up to 10 days. The lagoon is continuously aerated for 24 hours. The BOD removal efficiency of the aerated lagoon method is equivalent to that attained by a standard activated sludge method. However, the de-nitrification can hardly be expected when the lagoon method is used.

Figure 3:
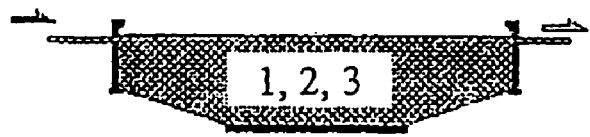
FIG. 3 is a side view of a single-reactor de-nitrification system of the invention.

FIG. 3 shows a system of the present invention, which may be referred to as a hybrid reactor (or lagoon) system. A test reactor (or lagoon) of the present invention may contain 20 l of suspension mixture. In a larger scale, the reactor may contain a medium of an order of e.g. 5 m³ for a pilot plant, or an order of e.g. 10,000 m⁵ or more for an industrial plant.

Compared to the known aerated lagoon, the hybrid reactor or lagoon system of the invention has substantially an inverted frusto-conical shape. By virtue of this shape, lumps of the activated sludge are floated homogeneously in the reactor by the aeration. This state is not significantly modified by increasing or decreasing the aeration. Accordingly, one advantageous feature of the hybrid reactor is that measured values do not depend on the locations or positions where measuring sensors are installed. The BOD value of the loads to be introduced in a hybrid reactor is preferably less than 0.16 kg/m³ per day. For the treatment of town or urban sewage, the hybrid reactor is usually required to have a volume sufficiently large to store the effluents equivalent to one or 2 days' discharge. Further, the hybrid reactor of the invention is used for a batch treatment, in which BOD removal reaction 1, nitrification reaction 2 and de-nitrification reaction 3 proceed simultaneously in harmony, in a single reactor.

Figure 4:
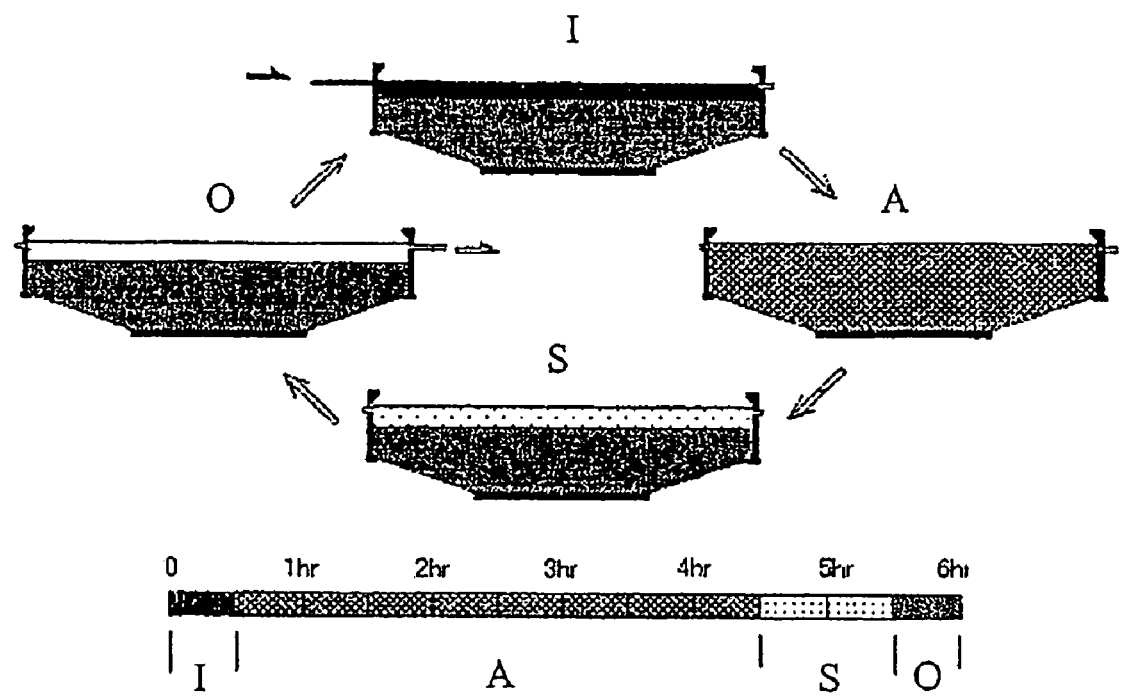
FIG. 4 is a side view of the single-reactor de-nitrification system of FIG. 3, illustrated by functionally separating steps I, A, S and O, with corresponding treatment times shown in a band representation.

FIG. 4 illustrates a typical cycle of waste water treatment process carried out in the same reactor, the cycle comprising different operational steps, which are separately shown as a function of treating orders and duration. In the figure, letters "T" "A" "S" and "O" indicates a waste water inflow step, an aeration step, a sedimentation step and a treated water outflow step, respectively. This cycle can be repeated as many times as necessary. For town sewage, one cycle may last 6 hours, one day thus comprising 4 cycles. However, depending on waste water quality and quantity, one cycle may last 8 hours, one day thus comprising 3 cycles. Typically, the inflow period, the aeration period, the sedimentation period and the outflow period are set to last 30 minutes, 4 to 6 hours, one hour and 30 minutes, respectively. The inflow amount of waste water per cycle and the outflow amount of treated water per cycle are substantially equal, and usually account for 20 to 25% of effective volume of the reactor, respectively.

Figure 5:
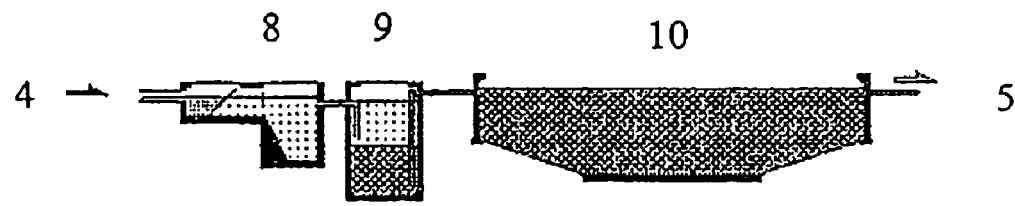
FIG. 5 is a side view of an installation of the invention, referred to as "hybrid reactoror "hybrid lagoon", equipped with ancillary device units.

FIG. 5 shows a hybrid reactor system, in which a reactor 10 is equipped with a pre-treatment unit 8 and a inflow rate regulator unit 9, references 4 and 5 signifying, respectively, town sewage and treated water.

Figure 6:
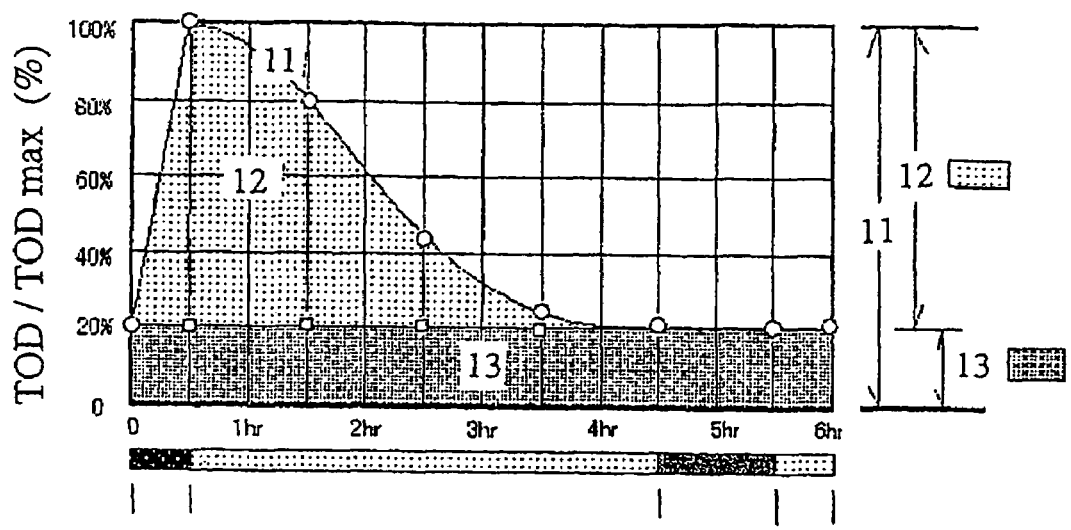
FIG. 6 is a graphic representation of changes in Total Oxygen Demand ratio of a suspension (biomass) mixture as a function of time elapsed in a cycle of 6 hour-water treatment process (TOD at the end of the inflow step of water to be treated under Program A infra is taken as 100%)

FIG. 6 shows changes in Total Oxygen Demand ratio of the suspension mixture indicated in ordinate, as a function of the elapsed time in the course of a six-hour water treatment cycle indicated in abscissa. The Total Oxygen Demand ratios are calculated relative to TOD at the end of inflow step which is taken as 100%. The TOD depends on oxygen amounts required for respiration of activated sludge and oxygen amounts required for removing the pollutants. The oxygen amount required by the activated sludge can be raised by internal factors, for instance, functional changes of activated sludge (e.g. acquisition of nitrification capacity). Likewise, the required oxygen amount varies depending on the quantity and quality of introduced waste water. Moreover, it increases or decreases, depending on ups-and-downs of activated sludge activities due to water-temperature change. Such changes in internal and external factors make vary the TOD all the time, so that constant analyses and calculations of the required oxygen amount are practically impossible. In the figure, references 11, 12 and 13 represent, respectively, the time-dependent change in TOD ratio (%), the area corresponding to the oxygen amount required by activated sludge and the area corresponding to the oxygen amount required for the removal of pollutants.

Figure 7:
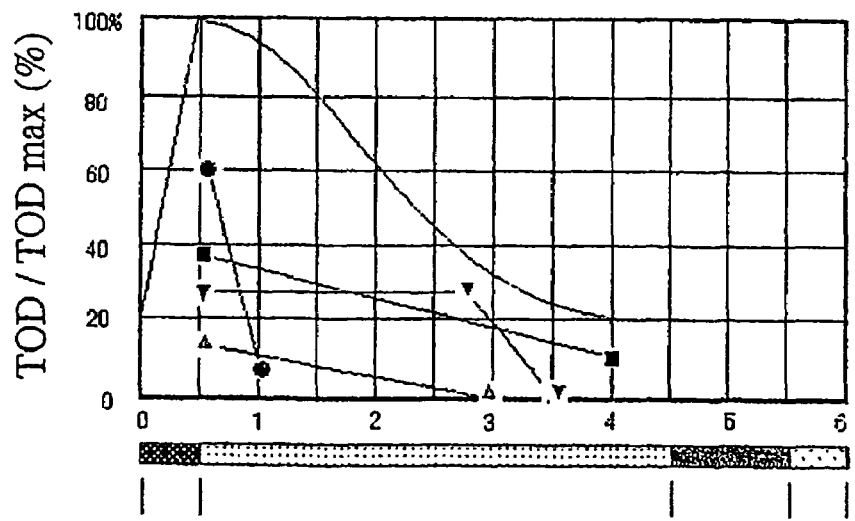
FIG. 7 is a graphic representation of changes in TOD ratio and water quality of a suspension mixture, as a function of time cycle as in FIG. 6.

FIG. 7 shows a correlation between the change in TOD ratio (%) and the change in water qualities obtained. This correlation depends on the time-dependent change in TOD ratio of FIG. 6 and variations in introduced pollutants. The BOD represented by line ● increases with inflow waste water and decreases quickly under aeration, whilst the COD and Org.-N respectively represented by line ■ and line Δ decrease slowly with time.

On the other hand, $NH_3$—N shown by line ▼ decreases only after Org.-N has disappeared. When pollutants supplied in a hybrid reactor have been completely removed, oxygen amount required by the activated sludge decreases, so that excess oxygen is detected as dissolved oxygen.

Figure 8:
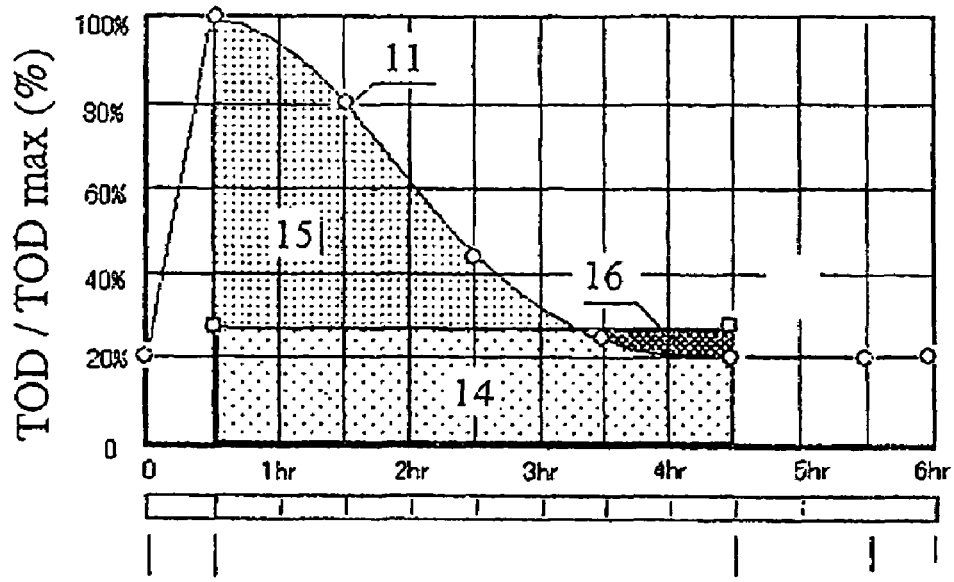
FIG. 8 is a graphic representation of TOD ratio change relative to time cycle as in FIG. 6, which suggests a simultaneous presence of nitrification reaction and de-nitrification reaction in a symbiotic microbial system.

FIG. 8 is a graphic representation of "symbiotic" reactions of nitrification and de-nitrification. Oxygen amount supplied by aeration (corresponding to area 14) is given as a product of "aeration intensity" and "aeration time". The type of aeration applied here is defined as "weak aeration" for the purpose of the present invention and usually forms a rectangular shape extending along the abscissa (enclosed by bold lines). The weak aeration defined above should avoid supplying excess oxygen by excessive aeration, while ignoring the oxygen consumption rate achieved by activated sludge. This oxygen transforms organic nitrogen into inorganic nitrogen, i.e. ammonia-type nitrogen. The latter is then transformed into nitrate-type nitrogen by additional oxygen. This series of reactions is called "a nitrification reaction". During the time span in which TOD ratio of activated sludge is higher than the oxygen amount supplied by aeration, nitrate-type nitrogen generated by nitrification reaction undergoes nitrate respiration. Oxygen is then recovered and nitrogen is released into air. In this figure, area 15 covers the region where the oxygen amount fed by aeration is in short supply (and the dissolved oxygen cannot be detected), whilst area 16 covers the region where the oxygen amount fed by aeration is in excess (and the dissolved oxygen can be detected).

Figure 9:
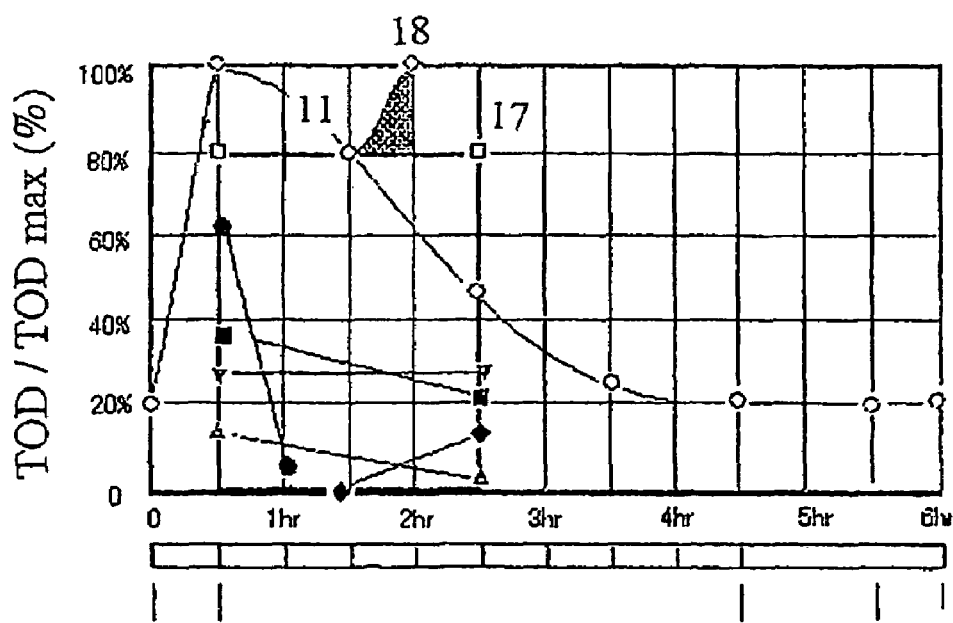
FIG. 9 is a graphic representation of changes in TOD ratio and in water qualities of a suspension mixture under strong aeration, as a function of time cycle as in FIG. 6.

FIG. 9 shows the results of water analyses of the suspension mixture under aeration. The type of aeration applied here is defined as "strong aeration" for the purpose of the present invention and typically forms a rectangular shape extending along the ordinate (enclosed by bold lines). The TOD ratio is shown by curve 11, whereas oxygen amount supplied by aeration is represented by area 17. Under strong aeration, dissolved oxygen increases in short delay, as shown by area 18. However, as nitrification reaction becomes inhibited by the allosteric effect caused by reaction products, the nitrification reaction stops short of completion. Besides, nitrate respiration is not induced under these conditions. In the figure, BOD and COD are respectively represented by line ● and line ■, whilst $NH_3$—N and Org.-N are respectively represented by line Δ and line ▼. Further, oxidized nitrogen is indicated by line ♦.

Figure 10:
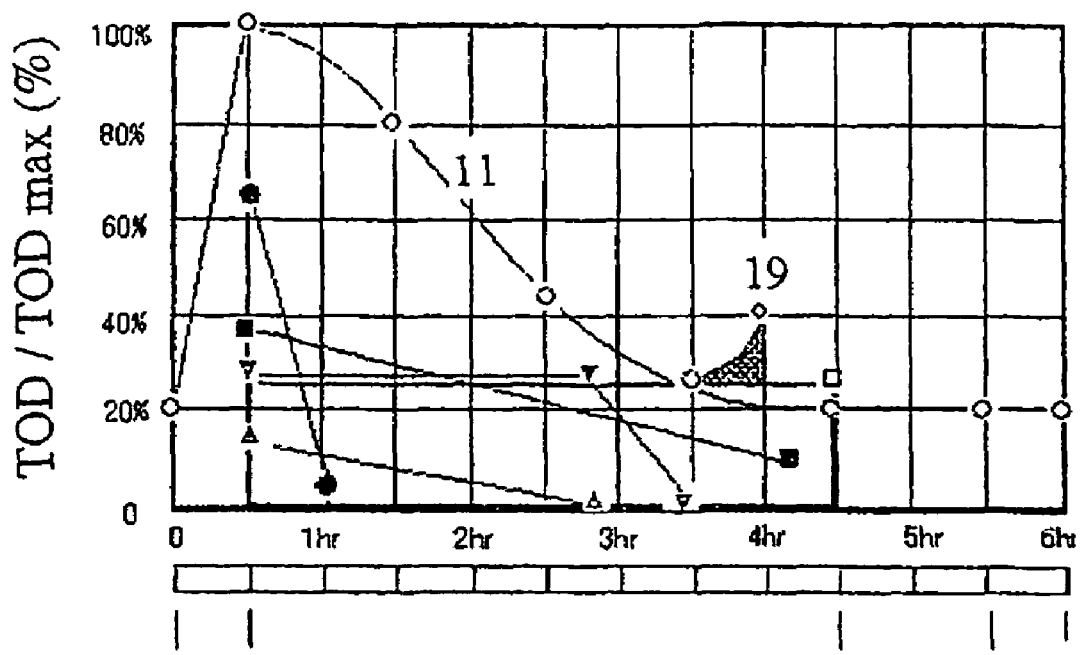
FIG. 10 is a graphic representation of changes in TOD ratio, in nitrification reaction and in nitrate respiration under weak or soft aeration, as a function of time cycle as in FIG. 6.

FIG. 10 is a graph showing time-dependent changes in TOD ratio (%), nitrification reaction and nitrate respiration, under weak aeration. The TOD ratio (%) is shown by curve 11, whereas changes in BOD, COD, $NH_3$—N and Org.-N are shown by lines line ●, line ■, line ▼ and line Δ, respectively. Further, DO is shown by area 19. This figure shows that the nitrification reaction and de-nitrification reaction co-exist under weak or soft aeration. When they co-exist in the hybrid reactor, the nitrate-type nitrogen generated by nitrification reaction is immediately released into air as $N_2$ gas through nitrate respiration. As a result, the reactions are not inhibited by the products formed by these reactions themselves, although a closed reactor usually suffers from such inhibition. Nitrogen removal then proceeds very quickly. Hence, the present invention makes use of the correlation between patterns of DO concentration curve and termination of nitrogen removal, under weak aeration.

Figure 11:
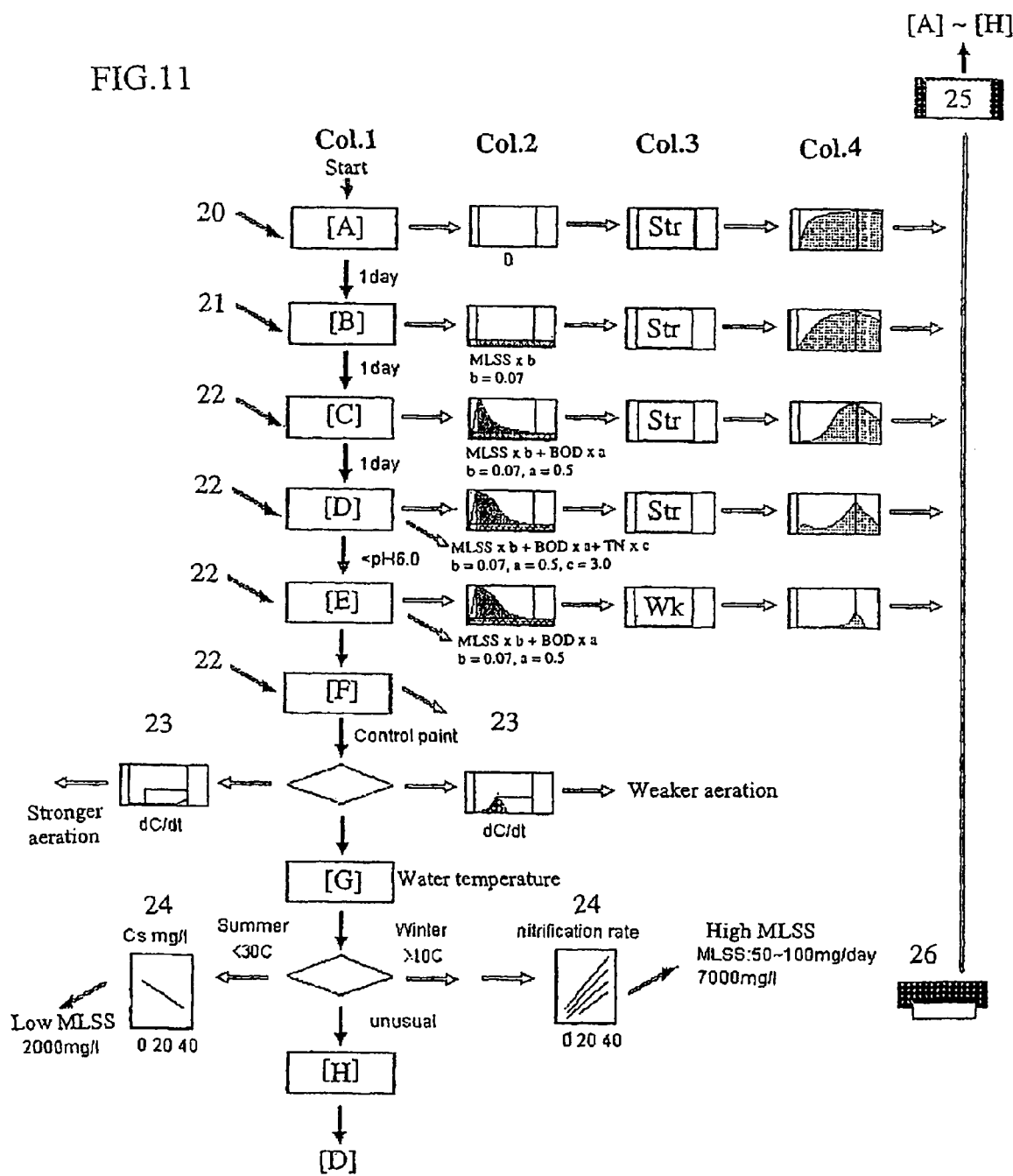
FIG. 11 is a flow chart showing different waste-water treatment programs (Program A to Program H) and control parameters.

FIG. 11 is a flow chart showing how the waste water treatment steps of the present invention are operated and controlled.

Column 1 comprises programs covering Program A to Program H, in which:

Program A (referred to as [A] in the figure) enables to perform a test called "device checking", in which the aeration capacity of the installation, in particular, is checked. In this program, a reactor is filled with clean water (e.g. tap water) and subjected to maximum aeration. The functioning of aeration devices, measuring devices, oxygen meter, pH meter, thermometer and the like is verified through this program.

Program A also enables to determine the Saturated Oxygen Concentration "Cs" at a given water temperature on the installation site, when the DO concentration attains the maximum level after at least one hour of aeration.

Program A usually takes one day or less. When a typical curve feature shown in Col. 4 is obtained, this program is switched to Program B.

Program B (referred to as [B] in the figure) runs a test called "evaluation of activated sludge qualities", in which the BOD removal capacity of activated sludge is checked. In this program, the above clean water in the reactor is supplied with activated sludge to give 2,000 mg/l of solid material (2,000 mg of Mixed Liquor Suspended Solids, i.e. MLSS), and aerated under maximum design capacity.

Program B does not use waste water. Accordingly, TOD under Program B is entirely attributed to a basic oxygen demand of activated sludge, which is defined by "MLSS×b", in which "b" signifies oxygen demand coefficient. The above "basic OD" is calculated as follows:

when the reactor has an effective volume of 1,000 m³ and the activated sludge has a concentration of MLSS 2,000 mg/l, the reactor contains a MLSS quantity of 2,000 kg. This value is multiplied by an oxygen demand coefficient of 0.07, yielding a basic OD of 140 kg/day.

The level of time-dependent DO concentration curve under Program B is globally lower than that under Program A, due to an increase in basic OD of activated sludge.

Program B thus verifies the respiratory characteristics (e.g. respiration rate) of activated sludge and the curve pattern formed thereby.

This program for feeding activated sludge usually takes one day. When a typical curve feature shown in Col. 4 is obtained, Program C is started.

Program C (referred to as [C] in the figure) runs a test for investigating "adaptability of activated sludge to waste water", in which the adaptability of activated sludge to waste water is checked. Under this program, waste water is introduced for the first time into a reactor containing activated-sludge, and adaptability of the latter to waste water is examined.

Typically, the quantity of waste water to be introduced accounts for about 25% of the effective reactor volume, and the waste water, e.g. urban sewage, has a BOD of about 200 mg/l. The oxygen amount required for BOD removal is defined as "BOD×a", in which "a" signifies BOD removal coefficient. When the reactor has an effective volume of 1,000 m³ and waste water having a BOD of 200 mg/l is treated at a rate of 1,000 m³/day, the amount of BOD removed is equal to 200 kg/day. This value is multiplied by a BOD removal coefficient of 0.5, yielding an oxygen amount required for BOD removal of 100 kg/day.

This program may take only several days, when activated sludge having a BOD removal function is used. After a typical curve feature shown in Col. 4 is obtained, Program D is started.

Program D (referred to as [D] in the figure) enables to perform a test for evaluating "acclimatization of nitrifying micro-organisms", in which activated sludge having BOD removal capacity is acclimatized so as to acquire a nitrification function. In this program, a reactor is aerated at maximum capacity for a given period, so that the nitrifying micro-organisms can be cultivated.

The oxygen amount required for the nitrification by nitrifying micro-organisms in activated sludge can be calculated by "T-N×c", in which "c" signifies nitrification coefficient. When the reactor has an effective volume of 1,000 m³ and waste water having a nitrogen concentration of 100 mg/l is treated at a rate of 1,000 m³/day, the amount of nitrogen to be nitrified is equal to 100 kg/day T-N. This value is multiplied by a nitrification coefficient of 3.0, yielding an oxygen amount required for nitrifying the nitrogen of 300 kg/day.

This program usually takes several months.

The DO curve is somewhat perturbed at the beginning of aeration due to nitric acid formed by nitrifying micro-organisms. After having observed curve disturbances, aeration is reduced and optimized under Program F.

Program E (referred to as [E] in the figure) enables to perform a test for assessing "acclimatisation to the de-nitrification function", in which activated sludge having a nitrification function is acclimatised so as to acquire a de-nitrification function. According to this program, once the presence of nitrifying function in activated sludge is verified, aeration is reduced so that the de-nitrification function can be created. In this manner, a BOD removal function, a nitrification function and a de-nitrification function are concurrently created. By virtue of the co-presence of these functions, the energy required for nitrification can be compensated easily.

Through Program A to Program E, the following observations can be made.

In the waste water inflow step, aeration for oxygen supply is not yet commenced. Accordingly, oxygen consumption due to activated sludge increases by the introduction of waste water, so that the DO concentration decreases quickly, and usually becomes zero during this period.

Since the aeration is interrupted prior to the sedimentation step, the DO concentration decreases in a straight line during this step as the result of oxygen consumption by activated sludge. However, under Program A in which clean water is used, there is no oxygen demand created by activated sludge, so that the DO concentration does not decrease substantially under this program.

Program F (referred to as [F] in the figure) enables to carry out a test for "aeration optimisation in response to variations in inflow waste water", in which aeration amount is optimised against variations in waste water volume. There forms thus an environment in which the nitrification function and the de-nitrification function continue to co-exist in the activated sludge. In this program, the aeration is automatically optimized in response to external disturbances "type 1", e.g. amounts of inflow waste water, variations in substrate, etc.

Under this program, aeration volume is optimised vis-à-vis the variations in quality and quantity of inflow waste water. By virtue of this optimization, TOD can be further reduced.

Typically, an installation is designed to adapt to variations ranging from 20% to 120% of effective capacity.

Program G (referred to as [G] in the figure) enables to carry out a test for "optimization of activated sludge quantities in response to variations in medium temperature", in which the amount of activated sludge is optimized vis-à-vis water temperature variations, so the de-nitrification function of activated sludge can be maintained and oxygen is prevented from running short. In this program, when the medium temperature goes down below 10° C. (external disturbances "type 2") and the de-nitrification function decreases, the concentration of activated sludge is increased within the limit of oxygen-supply capacity, so that the de-nitrification function can be maintained. Conversely, when the medium temperature goes up above 30° C. (external disturbances "type 3") and the oxygen diffusion coefficient decreases, the concentration of activated sludge is decreased within a limit acceptable for de-nitrification capacity, so that lack of oxygen can be avoided.

Program H (referred to as [H] in the figure) enables to perform a test for "detection of anomaly and automatic restoration of de-nitrification function", in which anomalies in the de-nitrification function are detected and restoring operations of this function are undertaken. Such anomalies are found by checking abnormal shapes in DO concentration ratio curve. The de-nitrification function is then automatically restored.

In order to trace trace-dependent qualities of treated water, DO concentrations are analyzed while aerated under strong or weak intensity. As a result, it was shown that weak aeration intensity creates a co-existence of oxidation zone, reduction zone and DO zone.

Further, in FIG. 11, references 20, 21 and 22 respectively signify clean water, activated sludge and town sewage.

Column 2 comprises the charts relating to TOD/TOD max (%) of activated sludge. Program A contains clean water only, so TOD is zero. In Program B, TOD is composed entirely of the basic OD of activated sludge, e.g. 140 kg/day. In Program C, TOD is composed of the basic OD of activated sludge supra (140 kg/day) and oxygen amount required for removing the BOD of waste water (e.g. 100 kg/day), i.e. a total of 240 kg/day. In Program D, oxygen amount required for nitrifying the nitrogen in waste water (e.g. 300 kg/day) is added to TOD under Program C, resulting in a total of 540 kg/day. In Program E on the other hand, the oxygen amount consumed for nitrifying the nitrogen in waste water (300 kg/day) is recovered through the nitrate respiration (reduction of nitrate) by activated sludge. Then, TOD under Program E becomes equal to that under Program C. The nitrification reaction and nitrate respiration by activated sludge are thus concomitantly present, so that excess aeration for removing waste water nitrogen can be avoided.

Column 3 comprises the charts relating to oxygen amount supplied by aeration, in which references Str and Wk signify strong aeration and weak aeration, respectively.

Figure 12:
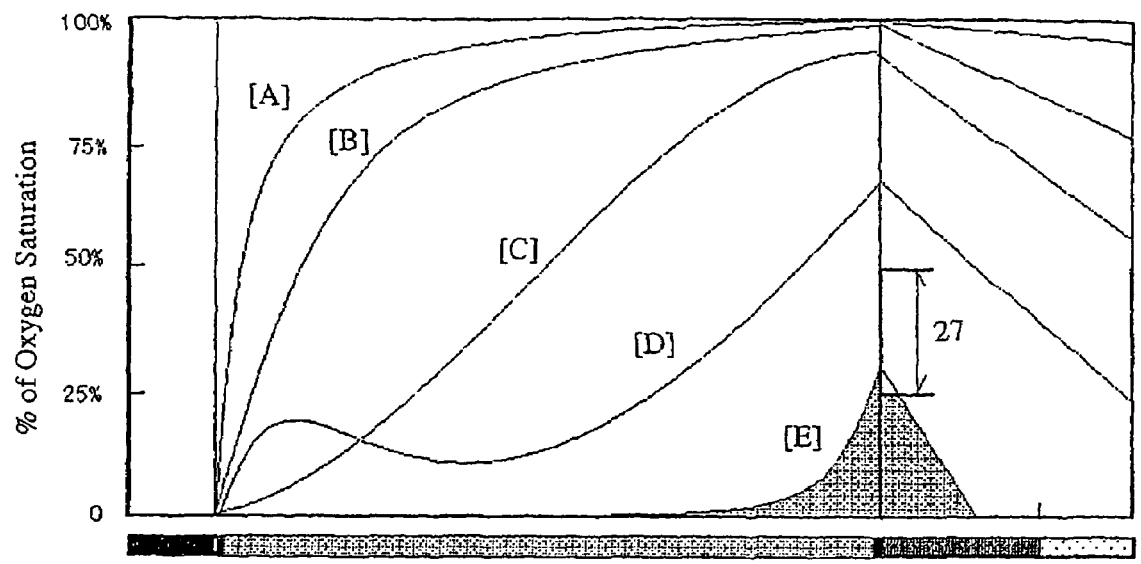
FIG. 12 schematically shows the changes in DO concentration ratio (expressed as % of saturated DO concentration at the end of aeration step under Program A), obtained under different programs, as a function of time elapsed in a cycle of 6 hour-water treatment process.

Column 4 comprises the charts relating to DO concentration ratios which indicate differences between TOD of column 2 and supplied oxygen amount of column 3 (see FIG. 12).

Reference 23 relates to a chart on DO concentration ratios (see FIG. 13); reference 24 relates to a chart on nitrification speed of activated sludge and saturated DO concentration (see FIG. 14); references 25 signifies a programming device and sequencer, whilst reference 26 signifies a recorder.

FIG. 12 schematically shows changes in Percentage of Oxygen Saturation (DO/Cs by %), as a function of lapsed time in one treatment cycle. The values of "Percentage of Oxygen Saturation" are defined as the ratio of "DO (mg/l) in the suspension mixture" with respect to "Saturated Oxygen Concentration (mg/l) in clean water" (expressed by %), measured under the same temperature and pressure.

As regards this figure, the oxygen transfer speed "dC/dt" in an aeration reactor is defined by the following formula:

$$dC/dt = Kla\ [Cs-C] - r \qquad (I)$$

in which "Kla" represents the overall oxygen transfer coefficient, indicating the oxygen-supply capacity generated by aeration; "Cs" represents the Saturated Oxygen Concentration (mg/l) in the suspension mixture; "C" represents the current DO concentration (mg/l) in the suspension mixture; and "r" represents the Oxygen Utilisation Rate (mg/l/h) in the suspension mixture.

This figure illustrates the shifts of curve pattern of the values of "Percentage of Oxygen Saturation" when the program is modified from [A] to [E]. Reference [A] shows a curve pattern obtained by measuring DO concentrations of clean water under Program A, which indicates the capacity of an aeration device. Reference [B] shows a curve pattern obtained by measuring DO concentrations of the suspension mixture under Program B, which indicates the treatment capacity of activated sludge. Reference [C] shows a curve pattern obtained by measuring DO concentrations of the suspension mixture under Program C, which indicates the adaptability of activated sludge to the pollutants. Reference [D] shows a curve pattern obtained by measuring DO concentrations of the suspension mixture under Program D, which indicates the acclimatisation level of nitrifying micro-organisms. Reference [E] shows a curve pattern obtained by measuring DO concentrations in the suspension mixture under Program E, which indicates the nitrate respiration function of nitrifying micro-organisms. From the foregoing, it can be understood that the oxygen demand changes, as a function of activated sludge changes depending on the program used. The patterns of the curves on "Percentage of Oxygen Saturation" thus enable to distinguish four stages from one another: acclimatization stage of activated sludge to create the nitrification function; automatic acclimatization stage of activated sludge to create the de-nitrification function; stage of forming an environment allowing the co-presence of these functions; and anomaly formation in the de-nitrification function.

Reference 27 indicates the extent of the value of "Percentage of Oxygen Saturation" at the end of aeration step.

Figure 13:
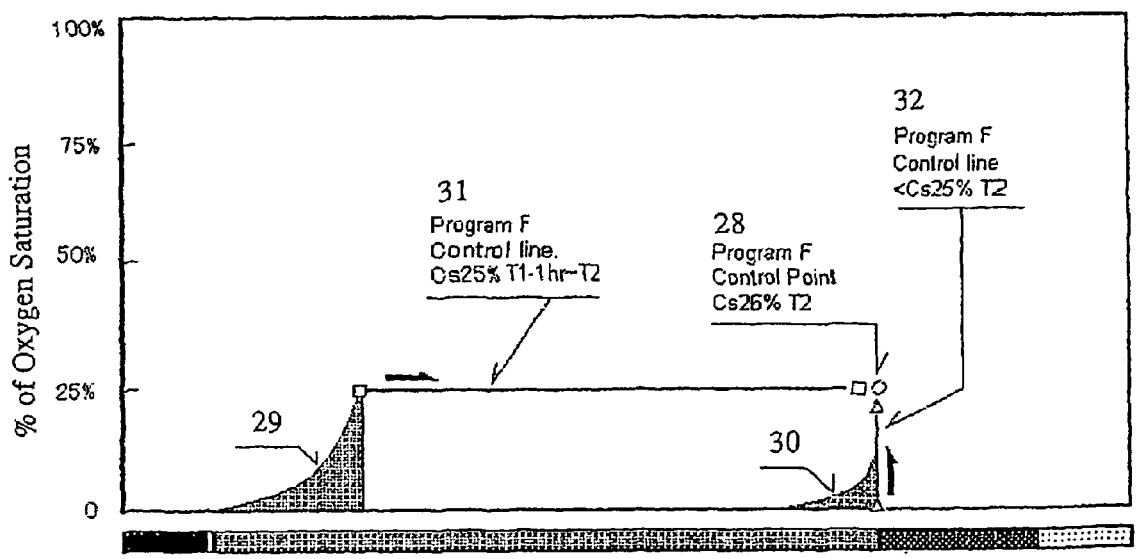
FIG. 13 is a graphic representation of the DO concentration ratio as a function of time cycle as in FIG. 12, showing the optimisation of aeration volume, the control points and the control extents that were obtained under Program F.

FIG. 13 explains the optimisation of aeration volume, the control points and the extents of aeration control. The ordinate represents the values of "Percentage of Oxygen Saturation", while the abscissa represents the time course of one treatment cycle. In Program F in which aeration volume is automatically controlled, the optimum aeration point is indicated by reference 28 and extents of aeration control are indicated by references 29 and 30. Program F is applied to activated sludge, subsequent to Programs A to E, and allows the sludge's nitrification and de-nitrification functions to be worked simultaneously, even if external factors vary.

According to Program F:

a) when the value of "Percentage of Oxygen Saturation" attains about 25 to 50%, aeration is halted, and the aeration intensity for the next treatment cycle is reduced by about 5 to 10%;

b) when the value of "Percentage of Oxygen Saturation" does not attain about 25 to 50%, the aeration intensity for the next treatment cycle is increased by about 5 to 10%.

By repeating the above operations, the curves regarding "Percentage of Oxygen Saturation" come closer to the optimum point, i.e. 25 to 50% of oxygen saturation. The above process may be referred to as "optimisation of aeration volume by non-arithmetic algorithm".

As a result, even if there are caused variations in quantity and quality of waste water to be treated within the designed capacity of treatment system, the latter can maintain, against such variations, at least about 90% of de-nitrification rate in a stable manner. In FIG. 13, Reference 28 indicates the optimum point for aeration volume; reference 29 indicates a curve regarding "Percentage of Oxygen Saturation" when the aeration intensity is too high under Program F; reference 30 indicates a curve regarding "Percentage of Oxygen Saturation" when the aeration intensity is too low under Program F; reference 31 indicates the aeration-stopping line, when the aeration is halted at 25% and the aeration intensity for the next treatment cycle is reduced; and reference 32 indicates the aeration-raising line, when the aeration does not attain 25% and the aeration intensity for the next treatment cycle is increased.

FIG. 13 also shows that, when the pattern of this "Percentage of Oxygen Saturation" curve is maintained, the oxygen amount supplied is entirely consumed by activated sludge, thus causing no waste.

Figure 14:
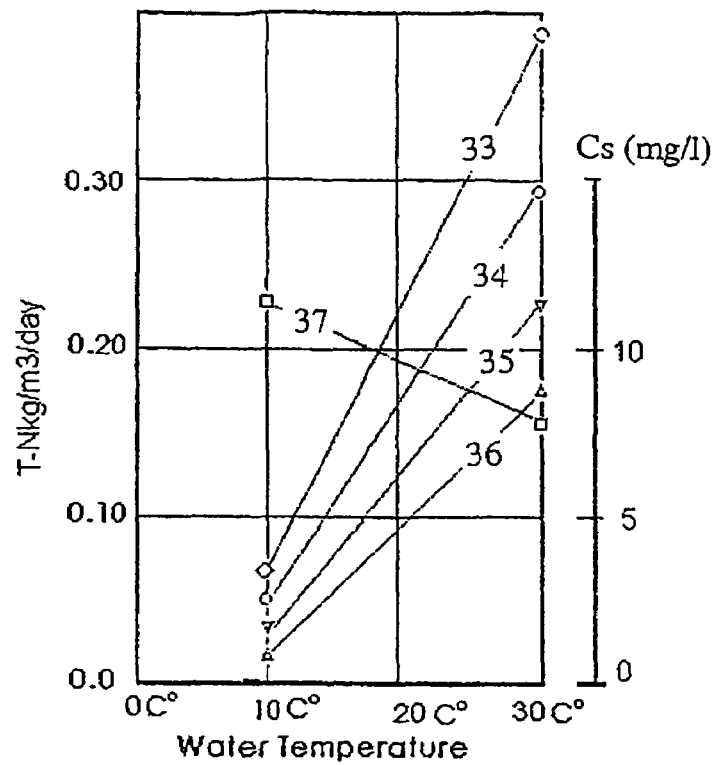
FIG. 14 illustrates relations between nitrification speed of activated sludge at different suspension concentrations, and water temperature, as well as relations between saturated DO concentration (mg/l) and water temperature.

FIG. 14 shows how the quantity of activated sludge is optimised. This figure illustrates the relation between the nitrification speeds obtained by activated sludge and the water temperature, as well as the relation between the water temperatures and the Saturated Oxygen Concentrations (Cs) in mg/l.

The ordinate at the left-hand side signifies the nitrification speed in the hybrid reactor expressed as "Total-N kg/m$^3$/day", whilst the abscissa signifies the water temperature ° C. in the hybrid reactor. When the temperature is lowered, the nitrification speed of activated sludge is also lowered. References 33, 34, 35 and 36 show the lines when the activated sludge concentrations "MLSS" tested are, respectively, 5,000 mg/l, 4,000 mg/l, 3,000 mg/l and 2,000 mg/l, whereas their temperature-dependent changes are scaled on the left-hand side ordinate.

Reference 37 indicates the change in Cs (mg/l) as a function of temperature, which is scaled on the right-hand side ordinate.

Usually, when the temperature is below 10° C., de-nitrification treatments become biologically difficult to be carried out. Further, when the water temperature becomes too high, the oxygen transfer coefficient obtained by aeration is lowered and the amount of oxygen begins to lack. In Program G, when the water temperature becomes less than 15° C. as often happens in winter time, the activated sludge, which is growing during waste water treatment, will be reduced to a concentration of MLSS 50 mg/l. Then, the extraction of activated sludge is interrupted, until its concentration becomes more than MLSS 5,000 mg/l, so that the nitrification speed can be maintained. Conversely, when the water temperature is high as often happens in summer time, the extraction amount of growing activated sludge is increased, so that the activated sludge concentration is lowered to less than MLSS 2,000 mg/l and the lack of oxygen can be avoided. In this manner, Program G optimises the concentration of activated sludge, within the limits of optimised aeration volumes.

Figure 15:
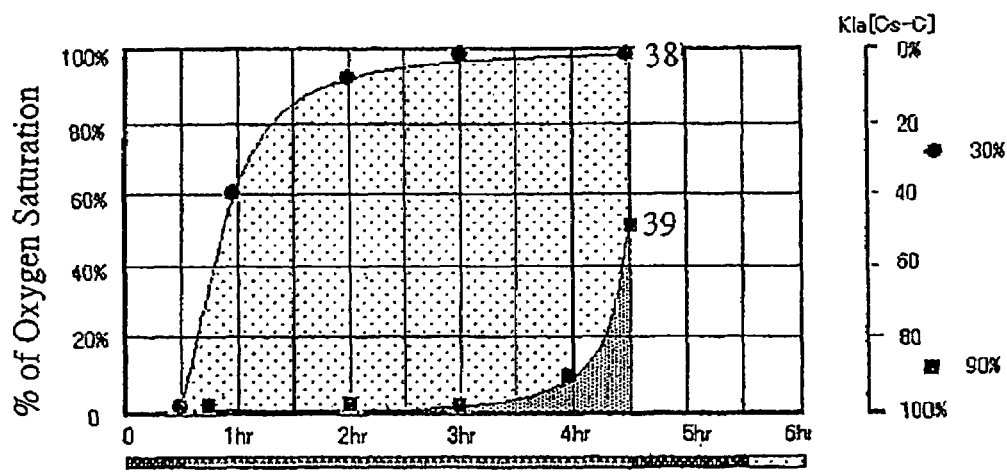
FIG. 15 shows changes in DO concentration ratio as a function of time cycle as in FIG. 12, in which curve 43 and curve 44 indicates time changes in DO concentration ratio, respectively, under strong aeration and weak aeration, and the right-hand side ordinate indicates changes in overall oxygen transfer coefficient "Kla", which is defined as an oxygen-supplying capacity in the aeration reactor.

FIG. 15 shows time-dependent changes in overall oxygen transfer coefficient "Kla", in which the ordinate signifies the values of "Percentage of Oxygen Saturation", while the abscissa signifies the time course of one treatment cycle. In the figure, curve 38 indicates a time-dependent change under strong aeration, whilst curve 39 indicates a time-dependent change under weak aeration. The amount of oxygen dissolved in water by aeration is inversely proportional to the DO concentration in water. The amount of oxygen supplied (O$_2$ kg) may be calculated as follows:

$$O_2(kg) = Q \times KLa [Cs - C] \quad \text{(II)}$$

wherein "Q" represents the volume of the suspension mixture in a hybrid reactor (m$^3$); "Kla" represents the overall oxygen transfer coefficient; "Cs" represents the Saturated Oxygen Concentration in the suspension mixture (mg/l) and "C" represents the current DO concentration in the suspension mixture (mg/l).

When designing a waste water treatment installation, the capacity of an aeration device is calculated on the basis of the formula (II). The lower the current DO concentration "C" is, the greater the difference (Cs−C) is. When the current DO concentration is zero (C=0), the difference (Cs−C) is maximum, and the oxygen transfer rate from air to water by aeration attains its highest value.

Conversely, when the current DO concentration is equal to Saturated Oxygen Concentration (C=Cs), oxygen does not migrate from air to water, irrespective of Kla value. Then, the oxygen transfer rate by aeration becomes zero, even if a strong aeration is effected. Although the aeration device is preferably designed to secure a high Kla value, such measure does not necessarily guarantee the most efficient aeration process, if the above-observations are not rightly taken into account.

In principle, when the oxygen amount supplied by aeration is reduced, the oxygen transfer rate is higher. However, a simple reduction of oxygen supply risks to cause a lack of oxygen, as the necessary oxygen amount can vary. FIG. 15 shows that, when the aeration is controlled using the "Percentage of Oxygen Saturation" curves of FIG. 13, the oxygen transfer rate becomes quite high. Such a controlling method enables to create a high de-nitrification function at high level and minimise the energies required for de-nitrification.

Accordingly, the oxygen transfer rate obtained by aeration is high when the value of "Percentage of Oxygen Saturation" is low. Conversely, the oxygen transfer rate obtained by aeration is low, when the "Percentage of Oxygen Saturation" curve is at high level under strong aeration. Moreover, at a low "Percentage of Oxygen Saturation" value, the oxygen amount moved into water is entirely consumed by activated sludge. Besides, the oxygen consumed by nitrification reaction is recovered by nitrate respiration, by virtue of the co-presence of nitrification reaction and de-nitrification reaction. Consequently, a high oxygen transfer rate can be maintained in the "Percentage of Oxygen Saturation" curve under Program F of FIG. 13.

Typically, each reactor of the present invention is provided with the following devices:

an aeration device including a volume meter, frequency regulation means and the like;

a stirrer including frequency regulation means and the like;

a measuring device including a dissolved oxygen measuring device (e.g. oxygen meter), a pH meter, a water thermometer and the like;

auxiliary devices e.g. a program sequencer for controlling the tests by virtue of automatic control software; and a multi-point recorder for recording the progress of tests and analysing the test results.

The values of "Percentage of Oxygen Saturation" and the quality of treated water may be correlated as a function of treatment time cycle. For instance, as shown in FIG. 7, TOD ratios are plotted as a function of an aeration program and treatment time cycle.

As shown in FIG. 8, the effect of symbiosis of micro-organisms is exploited at the maximum. In other words, a plurality of micro-organisms is contained in a single receptacle for the same time span, and the optimum symbiosis conditions are sought after. Firstly, the maximum reaction rate is attained by removing intermediate products. Secondly, the maximum reaction rate is attained gradually by promoting the activities of allosteric enzymes. Thirdly, the required oxygen amount is optimised, so as to economize oxygen.

The reduced aeration brings about the consequences shown in FIG. 15, according to which the lower the value of "Percentage of Oxygen Saturation" is, the higher the value of "Kla[Cs−C]" obtained by aeration is. In this figure, DO concentrations are measured and calculated by subtracting the consumed oxygen from the supplied oxygen.

In other words, when a low value of "Percentage of Oxygen Saturation" is maintained, the oxygen consumption is reduced.

Generally, the oxygen amount required for a de-nitrification installation is calculated as follows.

Designed oxygen amount=[$O_2$ for BOD removal+$O_2$ for activated sludge+$O_2$ for nitrification]×Security margin;

wherein $O_2$ for BOD removal is expressed by BOD (kg)×a, "a" being e.g. 0.5;

$O_2$ for activated sludge is expressed by MLSS (kg)×b, "b" being e.g. 0.07;

$O_2$ for nitrification is expressed by T-N (kg)×c, "c" being e.g. 3.0, where T-N means the total nitrogen composed of $NH_3$—N, $NO_2$—N and $NO_3$—N; and the security margin is from 20 to 50%.

In the optimisation process of the invention, $O_2$ addition for the nitrification process is not necessary. Accordingly, the amount of oxygen required by the present invention does not exceed that required for a simple BOD removal installation.

The designed oxygen amount is obtained by multiplying the inflow waste water (taken as 100%) by a security margin. However, actually, the quantity of inflow waste water rarely becomes 100%, so the required oxygen amount fluctuates constantly. The method of the invention enables to supply an optimum quantity of oxygen in response to this variation, so that unnecessary energy consumption is suppressed.

1. Adaptation Step

A reactor is filled with water, and aerated e.g. for about 24 hours in order to verify the performance of the test reactor.

Activated sludge is sampled in a typical installation for continuous waste-water treatments, and an appropriate portion thereof is inoculated in the above water to give a MLSS of about 2,000 mg/l. The whole mixture is aerated e.g. for about 24 hours, in order to verify the BOD-removal capacity of the activated sludge.

Micro-organisms contained in the activated sludge are acclimatised at two stages, under the following conditions:

treated waste water: sewage;

unitary treatment cycle: sewage inflow (e.g. 30 minutes)+aeration (e.g. 4 to 5 hours)+sedimentation (e.g. 1 to 2 hours)+supernatant outflow (e.g. 30 minutes);

daily cycle number: 3-4 cycles/day (every 6-8 hours);

number of unitary treatment cycles: 3-4/day;

inflow-outflow rate: about 25% per unitary treatment cycle;

BOD load: about 0.16 kg/$m^3$/day at the most; and concentration of activated sludge: MLSS>=about 2,000 mg/$m^3$.

a) First stage (creation of the nitrification function):

The aeration is effected at maximum intensity during the aeration period. The activated sludge usually acquires the BOD-removal and nitrification function in 60 to 90 days, and pH decreases to below 6.0.

b) Second stage (creation of the de-nitrification function):

After having confirmed the creation of nitrification capacity, the intensity and period for aeration are optimised.

Thus, when the value of "Percentage of Oxygen Saturation" attains about 25%, the aeration under way is stopped, and the aeration intensity for subsequent treatment cycles is reduced stepwise, e.g. by 2 Hz.

Conversely, when the value of "Percentage of Oxygen Saturation" does not attain the above threshold of about 25%, the aeration intensity for subsequent treatment cycles is increased stepwise, e.g. by 2 Hz.

By optimising the aeration intensity in this manner, the activated sludge usually acquires the de-nitrification function in 15 to 30 days.

2. Water-Treating Step

The second stage described above is applied mutatis mutandis.

3. Variation Control Process

The method of the invention enables to maintain a de-nitrification rate of about 90%, which is obtained automatically in a stable manner, irrespective of external turbulences.

When the volume and/or nature of sewage varies/vary, aeration is optimised within the limit of designed capacity, in response to the variations in oxygen demand of the sewage.

When the de-nitrification speed slows down owing to the lowering of medium temperature to e.g. less than 10° C., the sludge concentration is increased to e.g. 7,000 mg/l, so as to increase the de-nitrification capacity.

When the oxygen diffusion decreases due to the increase of medium temperature to e.g. over 10° C., the sludge concentration is decreased to 2,000 mg/l at the most, so as to prevent the oxygen shortage.

In this manner, the de-nitrification function in the activated sludge system of the invention is automatically stabilized against external turbulences, and maintained to a de-nitrification rate of about 90%.

4. Abnormality Detection and Automatic Restoration

The present method enables to detect the following abnormalities and automatically triggers a step for restoring the de-nitrification function:

Examples of abnormalities include those in inflow loads, breakdown of devices, electricity cut and other accidents.

In the present system, DO concentrations are neither detected nor controlled in a continuous manner. Instead, when pH exceeds 7.0, the system returns automatically to the adaptation step, so that the activated sludge recovers the de-nitrification function.

The present system causes, concurrently, a BOD-removing reaction, a nitrification reaction and a de-nitrification reaction. Further, the de-nitrification function is optimised against external turbulences. The system creates a high oxygen transfer rate and high oxygen utilization rate, so that energies are economized.

The system of the invention can reduce the total nitrogen in waste water by 90 to 95%, and can be applied to waste water containing a large range of BOD extending from about 100 to about 7,000 mg/l. The system can work at a temperature varying from less than 10° C. to more than 30° C. Moreover, it can save about 50% of energies, compared to conventional waste water treatment installations.

EXAMPLE

Clean water (5 m$^3$) was filled in a reactor. The reactor was preferably designed such that, when clean water was filled, the upper rim of the reactor's vertical wall stood at least 30 cm above the surface of the clean water. In this manner, the foams generated by the treatment were prevented from overflowing.

At a first stage, the clean water was subjected to aeration, and activated sludge, containing e.g. 10 g of dry solid, was added thereto, to give a suspension ratio of about 2,000 mg/l.

At a second stage, the aeration was continued for e.g. 4 hours at a rate of at least 5 m$^3$/h. Typically, this stage required a strong aeration, in order to enhance the BOD removal and to create nitrification functions in activated sludge. The aerating device was then run in fall capacity. There was no need to check dissolved oxygen (DO) concentrations, oxygen reduction potentials (ORP), temperatures, or the like.

Thereafter, the suspension mixture was allowed to stand e.g. for one hour, so that it separated into a supernatant portion and a sediment portion.

The supernatant portion was then withdrawn from the reactor over e.g. 30 minutes. The amount of water withdrawn was usually about 25% by volume of the initial suspension mixture.

Subsequently, waste water was introduced into the reactor over e.g. 30 minutes. The amount of waste water introduced was usually about 25% by volume of the initial suspension mixture, so as to keep the total medium volume to a level of about 5 m$^3$.

In the above case, one unitary cycle of treatment comprised about 6 hours, which can be broken down into about 30 minutes of waste water introduction step, about 4 hours of aeration step, about one hour of sedimentation step and about 30 minutes of withdrawing step.

The unitary cycle of treatment was then repeated until pH of the medium became less than about 7. This decrease of pH indicated the start of acclimatization of micro-organisms, resulting in the BOD removal (e.g. coefficient $k_1$) and nitrification (e.g. coefficients $k_2$ and $k_3$).

The above unitary cycle was further repeated until pH became less than about 6.8. Then, it was assumed that the de-nitrification (coefficient $k_4$) reaction had started. It could tale several weeks or even several months before the de-nitrification reaction took place in a stable manner.

When pH became below about 6.8, the aeration was decreased while maintaining this value. This aeration decrease could be performed using a frequency converter, by decreasing the frequencies of AC-current at a given pitch/cycle. For instance, frequencies were decreased from about 60 Hz toward a given frequency level (e.g. 20 Hz). The revolution of the motor in a compressor was then regulated by the converter at a pitch of about 2 Hz/(unitary cycle of 6 hours), and thus the air volume blown off by a blower was modified. About 2 Hz of decrease usually corresponded to 1 to 2% of aeration volume decrease. The aeration decrease was usually halted when the frequencies hit a level of about 20 Hz, and this level was maintained thereafter as far as pH stayed below about 6.8.

Conversely, when pH went up as a consequence of aeration decrease, aeration was gradually increased so as to maintain pH below about 6.8. In this manner, the waste water treatment could be repeated without any particular limit.

Stepwise regulations of the frequencies were carried out as follows.

After pH became below about 5.8, the aeration was further continued for one hour. When the value of "Percentage of Oxygen Saturation" attained about 25%, the aeration was stopped, and the aeration frequencies for the next unitary cycle were decreased.

On the contrary, if, after the aeration stop, the value of "Percentage of Oxygen Saturation" did not attain the level of about 25% defined above, the aeration frequencies for the next unitary cycle were increased.

When medium temperature decreased to below about 10° C. during the above process, evacuation of excess sludge was stopped so as to increase the amount of sludge, and the de-nitrification function was maintained.

Conversely, when the medium temperature increased to above about 20° C. and if, after the aeration is stopped, the value of "Percentage of Oxygen Saturation" did not attain the 25% level defined above, evacuation of excess sludge was intensified, so that lack of oxygen could be prevented.

When pH exceeded about 7.8, a strong aeration stage was resumed, so that the de-nitrification function could be recovered.

At the same time, a control person was alerted to check the installation. He checked whether or not the loads were excessive, the aerating device broke down, or the measurements were functioning normally, etc.

The results obtained in waste water treatment facilities are described in Tables hereunder. In these Tables:

BOD: measured after 5 day's reaction.

COD: potassium permanganate is used as oxidizer at 100° C. for 30 minutes.

MBAS: Methylene Blue Active Substances.

n-Hex.: n-hexane extracts

TABLE 1

Results of treatment for sewage: average of 12 samples, 1 m³/0.225 kWh.

| Item | Unit | Flow-in Max | Flow-in Mini | Flow-in Ave | Flow-in STD | Flow-out Max | Flow-out Mini | Flow-out Ave | Flow-out STD | Removal Ave |
|---|---|---|---|---|---|---|---|---|---|---|
| BOD | mg/l | 830 | 71.0 | 225.5 | 219.3 | 7.9 | 0.5 | 2.7 | 2.1 | 98.8% |
| COD | mg/l | — | — | — | — | — | — | — | — | — |
| Total-N | mg/l | 156 | 13.0 | 44.9 | 36.6 | 4.3 | 1.1 | 2.4 | 2.1 | 94.8% |
| Total-P | mg/l | 44 | 3.1 | 8.4 | 11.3 | 3.2 | 0.9 | 2.2 | 0.8 | 73.8% |
| SS | mg/l | 2800 | 72 | 369 | 768 | 6.4 | 1.8 | 3.4 | 1.8 | 99.1% |
| Temp. | °C. | 25.1 | 9.8 | 18.5 | — | 29.5 | 15.6 | 24.1 | — | — |
| MLSS | mg/l | — | — | — | — | 6100 | 2000 | 4008 | 1226 | — |

TABLE 2

Results of treatment for sewage: average of 12 samples.

| Item | Unit | Flow-in Max | Flow-in Mini | Flow-in Ave | Flow-in STD | Flow-out Max | Flow-out Mini | Flow-out Ave | Flow-out STD | Removal Ave |
|---|---|---|---|---|---|---|---|---|---|---|
| BOD | mg/l | 260.0 | 85.0 | 190.8 | 56.8 | 2.9 | 0.7 | 1.6 | 0.7 | 99.1% |
| COD | mg/l | 96.0 | 49.0 | 77.3 | 15.9 | 9.2 | 5.4 | 7.4 | 1.0 | 90.5% |
| Total-N | mg/l | 50.5 | 25.0 | 37.0 | 7.4 | 3.8 | 1.8 | 2.9 | 0.8 | 92.1% |
| Total-P | mg/l | 8.6 | 4.6 | 5.9 | 1.4 | 2.23 | 0.43 | 1.25 | 0.51 | 78.8% |
| SS | mg/l | 222.0 | 40.0 | 136.6 | 52.8 | 9.9 | 0.1 | 1.5 | 2.7 | 90.8% |
| Temp. | °C. | 31.8 | 6.3 | 18.5 | — | 26.6 | 13.5 | 20.0 | — | — |
| MLSS | mg/l | — | — | — | — | 5160 | 2600 | 3578 | 869 | — |

TABLE 3

Results of treatment for sewage: average of 12 samples.

| Item | Unit | Flow-in Max | Flow-in Mini | Flow-in Ave | Flow-in STD | Flow-out Max | Flow-out Mini | Flow-out Ave | Flow-out STD | Removal Ave |
|---|---|---|---|---|---|---|---|---|---|---|
| BOD | mg/l | 227 | 133 | 205 | 42 | 2.1 | 0.3 | 1.2 | 0.4 | 99.4% |
| COD | mg/l | 240 | 68 | 136 | 21 | 14.0 | 4.2 | 6.7 | 0.6 | 95.0% |
| Total-N | mg/l | 58.8 | 34.4 | 45.2 | 27.3 | 5.3 | 0.6 | 2.3 | 0.6 | 94.0% |
| Total-P | mg/l | 6.11 | 3.60 | 4.98 | 1.15 | 2.54 | 0.13 | 1.34 | 0.45 | 73.0% |
| SS | mg/l | 561 | 64 | 158 | 44.9 | 5.0 | 0.4 | 1.1 | 2.3 | 99.3% |
| Temp. of water | °C. | — | — | — | — | 21.8 | 7.2 | 13.9 | — | — |
| MLSS | mg/l | — | — | — | — | 4618 | 2130 | 3058 | 521 | — |

TABLE 4

Results of treatment for animal breeding/farming waste water: MLSS: 3,900 mg/l. MLVSS: 3,100 mg/l. SV-30: 95%;

| COMPONENT | UNIT | FLOW-IN | FLOW-OUT | REMOVAL | ANALYSIS |
|---|---|---|---|---|---|
| Appearance | — | Grey | Clear | — | JIS-K-0102 |
| Odour | — | Rotten | Odourless | — | |
| Transparency | — | <1 | >30 | — | JIS-K-0102.9 |
| Chloride ion | — | 652 | 424 | 409 | JIS-K-0102 |
| pH | — | 7.00 | 6.21 | 6.80 | JIS-K-0102.12 |
| BOD | mg/l | 1,000 | 1.0 | 4.0 | 99.6% | JIS-K-0102.21 |
| COD | mg/l | 361 | 5.9 | 6.6 | 96.3% | JIS-K-0102.17 |
| SS | mg/l | 320 | 10 | — | 96.0% | JIS-K-0102 |
| NH₃—N | mg/l | 171 | 0.6 | 1.2 | 99.6% | JIS-K-0102 |
| NO₂—N | mg/l | 0.26 | 0.04 | 0.22 | — | JIS-K-0102 |
| NO₃—N | mg/l | 0.50 | 0.80 | 3.60 | — | JIS-K-0102 |
| Kjeldahl-N | mg/l | 212 | 0.70 | 1.80 | 99.4% | JIS-K-0102 |
| Total-N | mg/l | 212 | 5.70 | 5.80 | 97.4% | JIS-K-0120.45 |
| Total-P | mg/ | 6.3 | 0.4 | 0.4 | 98.3% | JIS-K-0120.46.2.1 |

TABLE 5

Results of treatment for animal breeding/farming waste water:
MLSS: 5,400 mg/l, MLVSS: 4,260 mg/l, SV-30: 99%;
Weather, fair; temperature 17.3° C.; water temperature 14.2° C.

| COMPONENT | UNIT | FLOW-IN | SECONDARY-TREATMENT | COAGULATION | REMOVE |
|---|---|---|---|---|---|
| Appearance | — | Black | Muddy | — | — |
| Chloride ion | — | 970 | 308 | — | — |
| pH | — | 8.3 | 7.1 | — | — |
| BOD | mg/l | 13.000 | 16.0 | — | 99.8% |
| COD | mg/l | 15.600 | 71.3 | — | 99.6% |
| SS | mg/l | 39.000 | 8.6 | — | 99.9% |
| $NH_3$—N | mg/l | 2.930 | 1.1 | — | 99.9% |
| $NO_2$—N | mg/l | 0.01 | 0.75 | — | — |
| $NO_3$—N | mg/l | 0.50 | 0.70 | — | — |
| Kjeldahl-N | mg/l | 5.440 | 9.0 | — | 99.9% |
| Total-N | mg/l | 5.440 | 10.45 | — | 99.8% |
| Total-P | mg/l | 1.320 | 39.3 | #4.20 | 99.6% |

TABLE 6

Results of treatment for human waste:
MLSS: 2,070 mg/l, MLVSS: 1,910 mg/l, SV-30: 58%;
Weather, fair; temperature 28.8° C.; water temperature 26.5° C.

| COMPONENT | UNIT | FLOW-IN | SECONDARY-TREATMENT | COAGULATION | ADSORPTION | REMOVAL |
|---|---|---|---|---|---|---|
| Chromaticity | — | 12,800 | 1,330 | 259 | 180 | — |
| Chloride ion | — | 2.270 | 1,200 | 2,100 | 2,100 | — |
| pH | — | 7.9 | 6.7 | 5.9 | 5.7 | — |
| BOD | mg/l | 6,300 | 67.5 | 13.0 | 14.0 | 99.9% |
| COD | mg/l | 1,700 | 252 | 71.7 | 61.6 | 98.3% |
| SS | mg/l | 1,800 | 50.5 | 11.4 | 13.4 | 99.1% |
| $NH_3$—N | mg/l | 3,010 | 3.1 | 0.9 | 1.0 | 99.9% |
| $NO_2$—N | mg/l | 0.01 | 2.4 | 0.66 | 0.05 | — |
| $NO_3$—N | mg/l | 0.50 | 0.5 | 2.1 | 3.3 | — |
| Total-N | mg/l | 3.010 | 7.0 | 3.66 | 4.35 | 99.1% |
| Total-P | mg/l | 231 | 113 | 0.6 | 0.7 | 99.8% |

TABLE 7

Results of treatment for human waste:
MLSS: 4,500 mg/l, MLVSS: 4,000 mg/l, SV-30: 98%;
Weather, fair; temperature 30.8° C.; water temperature 26.1° C.

| COMPONENT | UNIT | FLOW-IN | SECONDARY-TREATMENT | COAGULATION | ADSORPTION | REMOVAL |
|---|---|---|---|---|---|---|
| Chromaticity | — | 7,900 | 404 | 237 | — | — |
| Chloride ion | — | 2,260 | 564 | 1,140 | — | *1.98 |
| pH | — | 8.0 | 7.0 | 6.6 | — | — |
| BOD | mg/l | 13,800 | 25.0 | 2.0 | — | 99.9% |
| COD | mg/l | 4,750 | 95.2 | 30.3 | — | 98.3% |
| SS | mg/l | 16,000 | 41.0 | 3.0 | — | 99.9% |
| $NH_3$—N | mg/l | 2,020 | 3.4 | 1.9 | — | 998% |
| $NO_2$—N | mg/l | 0.01 | 0.33 | — | — | — |
| $NO_3$-N | mg/l | 0.50 | 4.4 | — | — | — |
| Total-N | mg/l | 3,410 | 23.2 | 17.6 | — | 98.9% |
| Total-P | mg/l | 432 | 87.5 | 0.3 | — | 99.8% |

TABLE 8

Results of treatment for meat processing wastewater:
Q ($m^3$/day), BOD, SS, normal-hexane extracts, MLSS (mg/l).

| — | pH | BOD | SS | n-Hex | MLSS | Q | — | pH | BOD | SS | n-Hex | MLSS | Q |
|---|---|---|---|---|---|---|---|---|---|---|---|---|---|
| Year Av-1 | 7.1 | 9.3 | 8.9 | 0.41 | — | — | January | 6.9 | 3.0 | 5.8 | 0.4 | 7500 | 700 |
| Year Av-2 | 6.9 | 6.7 | 13.5 | 0.39 | 4300 | — | February | 7.2 | 2.2 | 3.0 | 0.7 | 6900 | 700 |
| Year Av-3 | 6.8 | 6.7 | 8.9 | 0.3 | 6500 | — | March | 7.1 | 6.4 | 5.8 | 0.1 | 7300 | 700 |

TABLE 8-continued

Results of treatment for meat processing wastewater:
Q (m³/day), BOD, SS, normal-hexane extracts, MLSS (mg/l).

| —         | pH  | BOD | SS  | n-Hex | MLSS | Q    | —         | pH  | BOD  | SS   | n-Hex | MLSS | Q    |
|-----------|-----|-----|-----|-------|------|------|-----------|-----|------|------|-------|------|------|
| January   | 7.2 | 2.8 | 5.8 | 0.1   | 6100 | —    | April     | 6.9 | 4.1  | 8.0  | 1.6   | 7200 | 700  |
| February  | 7.2 | 2.6 | 6.6 | 0.0   | 6600 | —    | May       | 6.9 | 1.6  | 5.4  | 1.0   | 8300 | 700  |
| March     | 7.0 | 4.8 | 4.8 | 8.8   | 6200 | —    | June      | 6.9 | 4.5  | 9.8  | 1.0   | 8900 | 800  |
| April     | 6.9 | 4.6 | 4.6 | 3.6   | 6800 | 700  | July      | 6.9 | 9.2  | 8.0  | 1.0   | 9900 | 850  |
| May       | 7.0 | 6.6 | 6.6 | 19    | 7400 | 700  | August    | 7.1 | 1.5  | 4.8  | >1    | 8100 | 850  |
| June      | 7.4 | 2.4 | 1.8 | 0.3   | 8500 | 800  | September | 7.1 | 6.8  | 22   | >1    | 6200 | 850  |
| July      | 7.0 | 9.5 | 9.5 | 28    | 8800 | 800  | October   | 7.1 | 5.8  | 4.0  | >1    | 6000 | 950  |
| August    | 7.1 | 2.2 | 2.6 | 0.6   | 4600 | 800  | November  | 7.2 | 7.3  | 1.2  | >1    | 5900 | 950  |
| September | 6.9 | 5.5 | 8.8 | 0.0   | 4200 | 800  | December  | 7.0 | 7.4  | 6.0  | >1    | 7200 | 1300 |
| October   | 7.0 | 3.6 | 15  | 0.0   | 4300 | 800  | Year Av-5 | —   | 4.74 | 10.9 | >1    | 6300 | 838  |
| November  | 7.1 | 5.4 | 22  | 0.2   | 4800 | 850  | —         | —   | —    | —    | —     | —    | —    |
| December  | 7.0 | 6.5 | 9.0 | 0.3   | 6500 | 1200 | —         | —   | —    | —    | —     | —    | —    |

TABLE 9

Results of treatment for household waste water:
Analysis of water samples

| COMPONENT    | UNIT | FLOW-IN | FLOW-OUT | REMOVAL | ANALYSIS     |
|--------------|------|---------|----------|---------|--------------|
| Appearance   | —    | Gray    | Clear    | —       | —            |
| Transparency | —    | <7      | >30      | —       | JIS-K-0102.9 |
| pH           | —    | 6.9     | 6.7      | —       | JIS-K-0102.12|
| BOD          | mg/l | 170.0   | 1.0      | 99.3%   | JIS-K-0102.21|
| COD          | mg/l | 67.0    | 3.5      | 94.7%   | JIS-K-0102.17|
| SS           | mg/l | 90.0    | <5       | 94.5%   | JIS-K-0102   |
| Total-N      | mg/l | 7.4     | 0.6      | 91.8%   | JIS-K-0102   |
| Total-P      | mg/l | 7.0     | 0.15     | 97.9%   | JIS-K-0102.46|

TABLE 10

Results of treatment for agricultural community and hog breeding waste water: Weather fair; temperature 25° C.; water temperature 20° C.

|             |      | 12 JUIN |          | 26 AUGUST |          |         |
|-------------|------|---------|----------|-----------|----------|---------|
| Component   | Unit | Flow-in | Flow-out | Flow-in   | Flow-out | Removal |
| Chloride ion| —    | 413     | 777      | 194       | 221      | —       |
| pH          | —    | 8.1     | 8.0      | 7.8       | 7.8      | —       |
| BOD         | mg/l | 2,100   | 4        | 330       | 2        | 99.4%   |
| COD         | mg/l | 900     | 26       | 150       | 16       | 89.4%   |
| SS          | mg/l | 560     | 2        | 75        | 0        | 100%    |
| Total-N     | mg/l | 908     | 62.2     | 21.5      | 4.3      | 80.0%   |
| Total-P     | mg/l | 31.5    | 4.32     | 10.4      | 9.9      | —       |
| MBAS        | —    | 5.77    | ND       | —         | —        | —       |

TABLE 11

Results of treatment for starch waste water:

| COMPONENT  | UNIT | FLOW-IN. A | FLOW-IN. B | FLOW-OUT | REMOVAL |
|------------|------|------------|------------|----------|---------|
| pH         | —    | 5.7        | 6.6        | 6.8      | —       |
| BOD        | mg/l | 2,600      | 27,000     | 14.0     | 99.4%   |
| COD        | mg/l | 897        | 11,400     | 69.7     | 92.2%   |
| SS         | mg/l | 1,040      | 7.530      | 11.5     | 96.8%   |
| $NH_3$—N   | mg/l | 123        | 164        | 4.9      | 96.0%   |
| $NO_2$—N   | mg/l | 0.01       | 0.03       | —        | —       |
| $NO_3$—N   | mg/l | 0.50       | 0.5        | —        | —       |
| Kjeldahl-N | mg/l | 307        | 2,530      | 11.3     | 96.30%  |
| Total-N    | mg/l | 307        | 2,530      | 11.3     | 96.30%  |
| Total-P    | mg/l | 43.2       | 422        | 14.2     | 67.2%   |
| n-Hex      | mg/l | 11.6       | 250        | 0.2      | 98.1%   |

TABLE 12

Results of treatment for noodle processing waste water:
MLSS: 3,950 mg/l, MLVSS: 3,800 mg/l, SV-30: 99%.

| COMPONENT  | UNIT | FLOW-IN. A | FLOW-IN. B | FLOW-OUT | REMOVAL |
|------------|------|------------|------------|----------|---------|
| BOD        | mg/l | 6,300      | 43         | 2.0      | 99.9%   |
| COD        | mg/l | 5,480      | 30.3       | 5.7      | 99.8%   |
| SS         | mg/l | 262        | 23.7       | tr       | 96.8%   |
| $NH_3$—N   | mg/l | 1.1        | 0.1        | tr       | 99.9%   |
| $NO_2$—N   | mg/l | 0.50       | 0.01       | 0.01     | —       |
| $NO_3$—N   | mg/l | 0.01       | 0.5        | 0.5      | —       |
| Kjeldahl-N | mg/l | 104        | 2.9        | 0.9      | 99.1%   |
| Total-N    | mg/l | 104        | 2.9        | 0.9      | 99.1%   |
| Total-P    | mg/l | 13.5       | 3.0        | 5.3      | 60.7%   |

When the treated water contained a total nitrogen of less than 3 mg/l, it can be used as drinking water, whilst, when the treated water contained a total nitrogen of less than 7 mg/l, it can be used as irrigation water.

The system according to the invention is based on a new concept, i.e. acclimatizing micro-organisms to be suitable for de-nitrification treatment, without relying to mathematical analyses. This system may serve to create a new type of industries adapted to environmental protection.

The inventive system can also eliminate nitric acid contamination in the ground water system, so that safe drinking water can be obtained very easily.

Further, the de-nitrification treatment of municipal sewage according to the inventive method yields clean water suitable for use as agricultural water.

When a pond is used as a reactor, repair work is very easy, so that running costs for de-nitrification treatment facilities are greatly reduced.

The method of the present invention may also serve to solve two major environmental problems simultaneously, i.e., preserving natural water sources and preventing water resources from drying-up. The de-nitrifying treatment process of the invention may further serve as a simple but efficient and economical tool for regenerating drinking water, irrigation water and/or industrial water from sewage water, thereby obviating damages that may be caused by poor environmental conditions.

The invention claimed is:

1. A method of treating water with activated sludge containing micro-organisms wherein said method comprises the steps of:—preparing an environmentally adapted biomass mixture by adapting said activated sludge to a quantity of water having given characteristics in a single reactor under first levels of aeration, whereby said environmentally adapted biomass mixture acquires the capacity to cause concurrent reactions for BOD removal, nitrification and de-nitrification; and—treating a portion of water having substantially the same given characteristics with said environmentally adapted biomass mixture capable of causing said concurrent reactions, in said single reactor under a second level of aeration not higher than said first levels of aeration.

2. A method of treating water according to claim 1, wherein said quantity of water having given characteristics is waste water.

3. The method of treating water according to claim 1, wherein said adapted-biomass preparing step comprises:—carrying out an initial adapting cycle treatment consisting essentially of: (a) a step of feeding said quantity of water into a solution of said activated sludge at a given inflow rate to prepare a suspension mixture; (b) an aeration step carried out under initial levels of aeration; (c) a sedimentation step for separating a supernatant portion and a sediment portion; and (d) a step of withdrawing said supernatant portion at an outflow rate substantially equal to said inflow rate, said steps (a), (b), (c) and (d) being repeated until said activated sludge can cause a BOD-removal reaction and a nitrification reaction; and—carrying out a subsequent adapting cycle treatment essentially consisting of the steps (a), (b), (c), and (d) defined above, except that said step (b) in said subsequent adapting cycle treatment is performed under subsequent levels of aeration lower than said initial levels of aeration, said steps (a), (b), (c) and (d) being repeated until said activated sludge can cause concurrent reactions for BOD removal, a nitrification and de-nitrification at a given pH value.

4. The method of treating water according to claim 3, wherein said water-treating step comprises:—carrying out a concurrent-reaction cycle treatment essentially consisting of: (a') a step of feeding said portion of water into said environmentally adapted biomass mixture at a given inflow rate; (b') an aeration step carried out under said second level of aeration substantially equal to said subsequent levels of aeration, at a given pH value; (c') a sedimentation step for separating a supernatant portion and a sediment portion; and (d') a step of withdrawing said supernatant portion at an outflow rate substantially equal to said inflow rate.

5. The method of treating water according to claim 3, wherein said given pH value stands between 6 and 7.

6. The method of treating water according to claim 3, wherein said given pH value is about pH 6.8.

7. The method of treating water according to claim 1, wherein said adapted-biomass preparing step or said water-treating step forms a unitary treatment cycle of about 6 to 8 hours.

8. The method of treating water according to claim 7, wherein said aeration step (b) or (b') lasts about 4 to 5 hours and comprises stirring said suspension mixture at an aeration rate of at least one volume equivalent per hour relative to the volume of said suspension mixture.

9. The method of treating water according to claim 7, wherein said feeding step (a) or (a'), as well as said withdrawing step (d) or (d'), respectively lasts about 30 minutes.

10. The method of treating water according to claim 7, wherein the amount of said supernatant portion withdrawn in said withdrawing step (d) or (d') is in the range of from about 20 to about 30% of the total volume of said suspension mixture.

11. The method of treating water according to claim 7, wherein said sedimentation step (c) or (c') lasts about one hour.

12. The method of treating water according to claim 3, wherein said solution of activated sludge in said adapted-biomass preparing step is prepared by feeding a portion of activated sludge into a clean water contained in said reactor to yield a suspension mixture having a predetermined suspension ratio of from about 1,000 to about 3,000 mg/l.

13. The method of treating water according to claim 3, wherein said solution of activated sludge in said adapted-biomass preparing step is prepared by feeding a portion of activated sludge into a clean water contained in said reactor to yield a suspension mixture having a predetermined suspension ratio of from about 1,500 to about 2,500 mg/l.

14. The method of treating water according to claim 3, wherein said method further comprises, subsequent to said withdrawing step (d) or (d'), the step of decreasing the aeration rate applied in said aeration step (b) or (b'), when said pH is below said given value.

15. The method of treating water according to claim 3, wherein said method further comprises, subsequent to said withdrawing step (d) or (d'), the step of increasing the aeration rate applied in said aeration step (b) or (b'), when said pH is above said given value.

16. The method of treating water according to claim 14, wherein said decreasing or increasing step comprises using a frequency converter and modifying the revolution of said aerating device by decreasing or increasing frequencies.

17. The method of treating water according to claim 16, wherein said frequencies for modifying the revolution of said aerating device are kept at about 20 Hz at the minimum.

18. The method of treating water according to claim 3, wherein said sedimentation step (c) or (c') comprises measuring dissolved oxygen concentrations, and extracting part of said sediment portion from said reactor, when said measured concentrations indicates that oxygen saturation ratio is below about 25%.

19. The method of treating water according to claim 3, wherein the temperature of said suspension mixture is kept between about 10° C. and about 20° C. by extracting part of said sediment portion from said reactor.

* * * * *

UNITED STATES PATENT AND TRADEMARK OFFICE
CERTIFICATE OF CORRECTION

| | | |
|---|---|---|
| PATENT NO. | : 7,585,414 B2 | Page 1 of 1 |
| APPLICATION NO. | : 10/586889 | |
| DATED | : September 8, 2009 | |
| INVENTOR(S) | : Hiroshi Kishi | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 544 days.

Signed and Sealed this

Fourteenth Day of September, 2010

David J. Kappos
*Director of the United States Patent and Trademark Office*